UNITED STATES PATENT OFFICE.

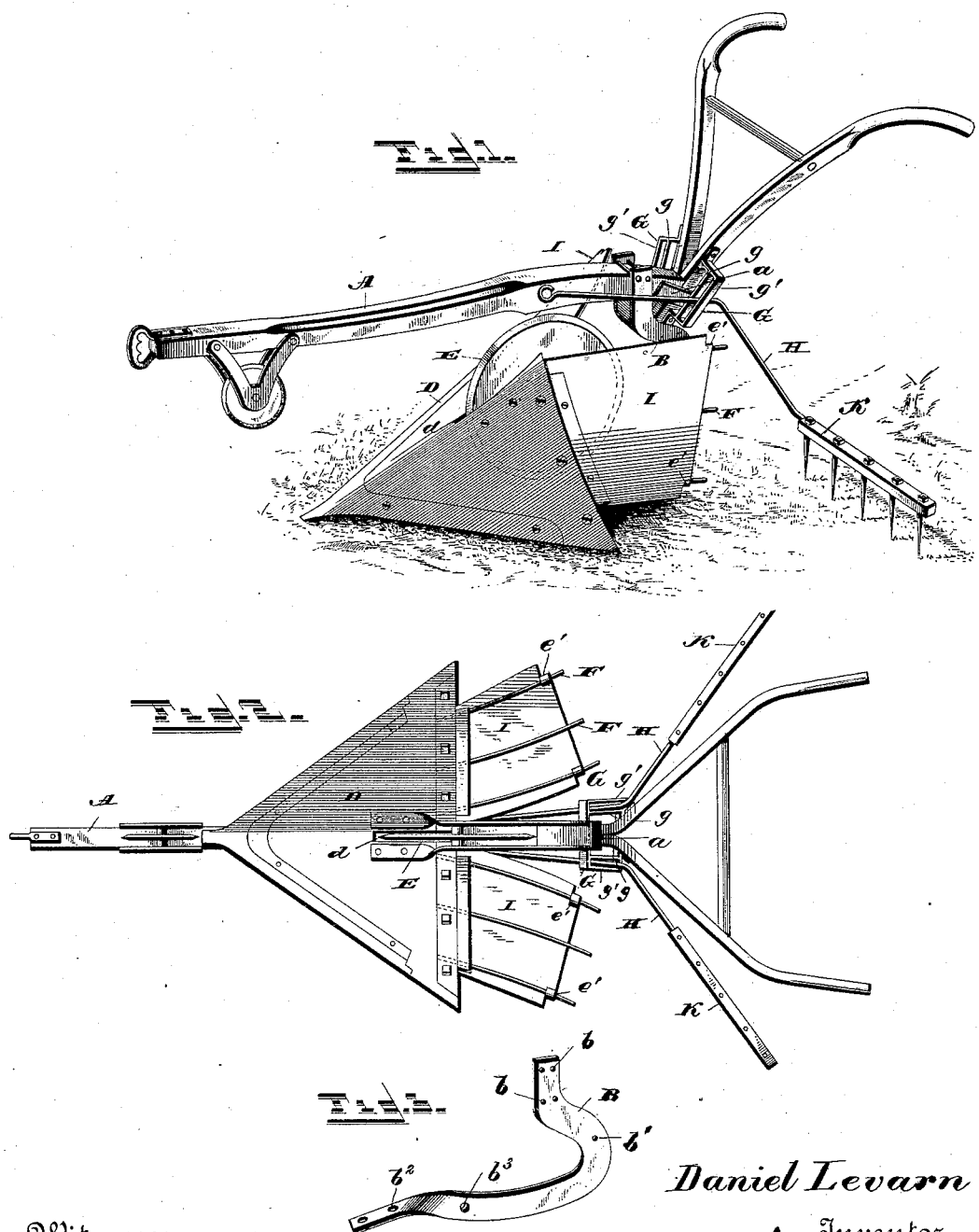

DANIEL LEVARN, OF NEW HAVEN, VERMONT.

POTATO-DIGGER.

SPECIFICATION forming part of Letters Patent No. 409,472, dated August 20, 1889.

Application filed March 21, 1889. Serial No. 304,130. (No model.)

*To all whom it may concern:*

Be it known that I, DANIEL LEVARN, a citizen of the United States of America, residing at New Haven, in the county of Addison and State of Vermont, have invented certain new and useful Improvements in Potato-Diggers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in potato-diggers, the same being designed more especially as an improvement upon my patent dated December 13, 1887, No. 374,797, the object of my present invention being to provide an implement with a rotary cutter, the lower portion of which is protected by the plow, so it will not injure the potatoes in digging the same, and also with rakes for separating the potatoes from the earth.

My invention consists in the construction and arrangement of the parts, as will be hereinafter fully set forth and claimed.

In the accompanying drawings, which illustrate my invention, Figure 1 is a perspective view of a potato-digger constructed in accordance with my invention. Fig. 2 is a bottom plan view. Fig. 3 is a detail view.

A refers to the beam, which is provided at its front portion with a clevis, to the rear of which is secured a colter. The rear end of the beam has attached thereto a metallic clip $a$, through which the lower ends of the handle-bars pass.

Instead of employing a standard, as shown in my prior patent, I attach on each side of the beam A bent bars B, the upper ends of which are provided with bolt-holes $b$, through which pass bolts for attaching the upper ends rigidly to the rear portion of the plow-beam in front of the clip $a$. These bars curve from their upper ends downwardly and rearwardly, and have perforations $b'$, through which passes a bolt for connecting the same to the lower ends of the handle-bars. These bars extend forwardly and are bent, as shown in Fig. 3, and the lower front ends have perforations $b^2$, through which bolts pass for connecting these bars rigidly to the under side of the shovel-plow D.

The shovel-plow is provided with a slot $d$, in which a colter or wheel E passes. This colter or wheel is provided with a beveled or cutting edge, and has a pivot or axle which has bearings in the perforations $b^3$, formed in the bars B.

The shovel-plow D, with the exception of the slot, is constructed substantially as shown in my prior patent above referred to, and the rearwardly-projecting rods or bars secured to the rear edge of the shovel-plow are provided with plates I, the rear corners of which are slit and bent over to form eyes $e'$, for connecting the outer ends of the plates to the rods F F.

To the lower ends of the handle-bars I attach brackets G, which are provided with double walls $g$ $g'$, so as to form a guide for the bars H, which pass between said guide-pieces and extend forwardly, where they are secured to the plow-beam. The rear ends of these bars are bent downwardly and outwardly, and to the ends are attached a bar K, which carries rake or harrow teeth, which will serve to separate the potatoes from the earth after they have been dug or removed from the ground by the mold-boards and plates I. It will be observed that these toothed bars K extend outwardly at an angle with the plow-beam, and also that they are allowed a slight vertical movement or play.

By protecting the lower portion of the colter or wheel E it will separate the sod or vines at the surface of the ground, but will not cut or injure the potatoes, and as the lower edge of the wheel is located a slight distance beneath the point of the mold-board it will serve to steady the plow.

By providing the mold-board with a slot and employing the boards B B, I am enabled to place the colter E as shown.

Having thus described my invention, what I claim as new, and desire to secure by Letters Patent, is—

1. In a potato-digger, the combination of a double-shovel plow, provided centrally at its upper portion with a slot, and a colter journaled beneath the mold-board, so that its upper portion will pass through the slot, the lower portion of said colter being on a line or beneath the point of the plow, substantially as shown, and for the purpose set forth.

2. In a potato-digger, the combination of a centrally-slotted double-shovel plow, separating-boards B B, attached to the double-shovel plow on each side of the slot, said boards being also secured to the handle-bars and plow-beam, and a wheel or colter E, journaled beneath the mold-board, so that its upper portion will extend through the slot in the plow and its lower portion be on a line with or below the plow-point, substantially as shown, and for the purpose set forth.

3. The combination, with a double-shovel plow, of the bars F, secured to the rear portion thereof, and plates I, mounted on said bars, said plates having the lower under guides and the upper rear corners bent under to form eyes $e'$, so as to embrace and slide on the bars, substantially as shown.

4. In a potato-digger, the combination of the beam A, plates B B, secured to said beam and to the lower ends of the handle-bar, said plates extending forwardly parallel with each other, the ends thereof being bent for attachment to the under side of the shovel-plow, a shovel-plow provided centrally with a slot $d$, through which slot passes the forward and upper portion of the colter, said colter being journaled to the plates B B and extending above and below the plow, and removable handles, substantially as shown, and for the purpose set forth.

In testimony whereof I affix my signature in presence of two witnesses.

DANIEL LEVARN.

Witnesses:
ORRA B. ROSCOE,
ALFRED P. ROSCOE.